United States Patent
Itoh et al.

(10) Patent No.: US 6,755,299 B2
(45) Date of Patent: Jun. 29, 2004

(54) ROLLER DEVICE AND A METHOD OF MAKING SAME

(75) Inventors: Kazuo Itoh, Kasai (JP); Kazuaki Kobayashi, Kasai (JP)

(73) Assignee: Itaoh Electric Company Limited (JP)

( * ) Notice: Subject to any disclaimer, the term of this patent is extended or adjusted under 35 U.S.C. 154(b) by 0 days.

(21) Appl. No.: 10/348,374

(22) Filed: Jan. 21, 2003

(65) Prior Publication Data

US 2004/0104102 A1 Jun. 3, 2004

(30) Foreign Application Priority Data

Nov. 29, 2002 (JP) ........................................ 2002-346818

(51) Int. Cl.⁷ ............................................... B65G 13/02
(52) U.S. Cl. ...................... 198/780; 198/788; 193/37; 29/525; 29/525.05; 29/525.06; 29/509; 29/505; 411/54; 411/54.1
(58) Field of Search ................................ 198/780, 788; 193/37; 29/525, 525.05, 525.06, 509, 505; 411/54, 54.1

(56) References Cited

U.S. PATENT DOCUMENTS

| | | | | |
|---|---|---|---|---|
| 119,504 A | * | 10/1871 | Brooks | 474/166 |
| 436,525 A | * | 9/1890 | Hemphill | 193/37 |
| 790,210 A | * | 5/1905 | Knox | 474/197 |
| 942,728 A | * | 12/1909 | Jones | 384/387 |
| 1,663,003 A | * | 3/1928 | Curtis | 384/572 |
| 1,721,626 A | * | 7/1929 | Higley | 411/54 |
| 1,825,119 A | * | 9/1931 | Mug | 198/788 |
| 4,648,767 A | * | 3/1987 | Fischer | 411/60.1 |
| 5,088,596 A | * | 2/1992 | Agnoff | 198/788 |
| 5,121,537 A | * | 6/1992 | Matsui et al. | 29/522.1 |
| 5,697,653 A | * | 12/1997 | Aigner et al. | 292/2 |

* cited by examiner

Primary Examiner—Richard Ridley
(74) Attorney, Agent, or Firm—Wood, Phillips, Katz, Clark & Mortimer

(57) ABSTRACT

A motor-installed roller (3) has a roller body (6) with ends closed with fixtures (7), and apertures (30,31) are formed in the roller body and fixtures, respectively. A recess (32) also formed in each fixture (7) extends in axial direction of this fixture so as to communicate with the aperture (31). A hollow pin (9) as the fastener has a solid basal portion (36) and a collapsible foot (35). This foot is deformed by an external force applied to the solid portion in its axial direction, so as to extend along the inner surface of the recess (32) such that the hollow pin (9) is locked in place not to slip off even if subjected to vibration. The solid portion (36) of this pin prevents the roller body (6) from moving relative to the fixture (7), or relative to any closures, bearings or the like easily attached to the roller.

24 Claims, 12 Drawing Sheets

ROLLER DEVICE AND A METHOD OF MAKING SAME

BACKGROUND OF THE INVENTION

1. Field of the Invention

The present invention relates to a roller device for use in a conveyor or the like apparatus and a method of making the roller device, and more particularly relates to the roller device whose characteristic feature resides in a structure of securing to a roller body a fixture that is accommodated therein wholly or partially.

2. Related Art

Various types of free rollers and/or motor-installed rollers have been employed to construct the conventional conveyors or the like apparatuses. Each free roller has comprised a roller body formed as a round cylinder supported by and rotating about a shaft, and each motor-installed roller has comprised a motor and a reducer both installed in the roller body.

In these prior art free rollers and motor-installed rollers, fixtures or closures for closing end openings of each roller body, as well as bearings or other constituent parts, have been fixed on or in the roller body. Usually, adhesives, set-screws, grooved pins, spring pins or the like fastening members have been used to secure such fixtures or parts to said roller body.

An example of the prior art structures is disclosed in the Japan Patent Laying-Open Gazette No. 6-171730. In this case, a fixing ring intervenes between the roller body and the fixture closing the open end thereof. A set-screw will be tightened sideways through a cap in order to firmly consolidate the fixture with said roller body in a wedge-like manner.

Arrays of these free rollers and/or motor-installed rollers are often used to transport any articles, goods or materials, suffering from mechanical vibration and shocks while they are transporting the articles. It has been observed often that holes or apertures for insertion of those set-screws or pins would possibly be widened gradually, loosening them and causing them to slip off at worst. In such an event, the roller bodies would no longer rotate smoothly, thus failing to transport the goods in an orderly manner.

If such set-screws or the like threaded fasteners are used for the described purpose, then those roller bodies and fixtures must be threaded not easily. A relatively complicated structure as proposed in the Gazette No. 6-171730 will render its assembling works very intricate to raise manufacture cost.

SUMMARY OF THE INVENTION

An object of the present invention is to provide such a roller device that its fixture such as a closure or bearing is easily secured to its roller body with use of a fastening member, lest any vibration or other mechanical stress transmitted or imparted to the roller device should cause the fastening member to slip off.

A roller device provided herein to achieve this object may comprise a roller body, a fixture accommodated at least in part in the roller body and secured thereto, and a fastener fixedly connecting a periphery of the fixture to a periphery of the roller body. The fastener comprises at least one transverse key driven in transverse apertures that are formed in the portions of the peripheries crosswise to an axis of the roller body. The transverse key is composed of a columnar solid portion and a cylindrical collapsible foot continuing therefrom, such that a thrust applied axially of the key to the solid portion will expand the collapsible food radially and outwards so as to inhibit the key from moving axially thereof, whereby the solid portion is retained in place to prevent the fixture from moving relative to the roller body.

When assembling this roller device, the at least one key as the fastener will be placed in the aperture and then struck transversely of the roller body. As a result, the cylindrical collapsible foot of the key will collapse so as to form a bulged flash. This flash hooks the rim of said transverse aperture so that the fixture will now be retained in the roller body much more strongly as compared with the prior structures, and the fastener itself will surely be protected from slipping off.

Such a fastener will never loosen itself, once its collapsible foot has deformed itself inside the roller body, even if any noticeable vibration is produced during a subsequent operation of this roller device. Owing to presence of the un-collapsed solid portion, the key as the fastener will reliably prevent displacement of the roller body relative to the fixture easily and surely consolidated therewith.

From another aspect of the invention, it provides a roller device comprising a roller body, a fixture accommodated at least in part in the roller body and secured thereto, and a fastener fixedly connecting the fixture to a periphery of the roller body. The fastener comprises at least one transverse key and at least one anvil member combined therewith. The key is composed of a columnar solid portion and a cylindrical collapsible foot continuing therefrom, such that a thrust applied axially of the key to the solid portion will expand the collapsible foot, with the solid portion being retained in place to prevent the fixture from moving relative to the roller body. The anvil member is shaped such that the thrust applied to the solid portion will force this member into the collapsible foot so that this foot is expanded radially and outwards.

When assembling this roller device, the at least one key as the fastener will be placed in the aperture and then struck transversely of the roller body. The anvil member thus entering the collapsible foot will serve to surely collapse it radially within the roller body so as to form a dilated foot. Such a dilated foot will retain the fixture in place in the roller body much more strongly as compared with the prior structures, and the fastener itself will surely be protected from slipping off.

Also in this case, the fastener will never loosen itself after its collapsible foot has been deformed inside the roller body, even if any notice able vibration is produced during operation of this roller device. Owing to the presence of the solid portion un-collapsed, the key as the fastener will reliably prevent the roller body from being displaced relative to the fixture having easily and surely been consolidated therewith.

Preferably, the collapsible foot of the key incorporated in the roller device may be a hollow portion of said key so that a weak force initially applied thereto from the outside does suffice well to deform said foot. Such a hollow foot will make it easier to more surely fix the fixture to the roller body.

Two or more fasteners may preferably be arranged at intervals around the roller body that constitutes the roller device of the invention.

External forces such as vibration acting on the periphery of roller device will be distributed to the fasteners. These fasteners are more surely protected from loosening themselves, with the apertures holding them becoming less likely to be deformed.

Preferably, each aperture formed in the fixture to receive the fastener may communicate with a recess that also is formed in the fixture so as to extend crosswise to a direction in which the fastener is inserted.

In this case, the fastener's collapsible foot will be guided to deform itself along the surface of such a recess in a direction crosswise to the direction in which the fastener is being struck. The recess extending in a direction crosswise to the direction in which said fastener is inserted will be effective to much surely prevent the slipping off of the fastener.

On the other hand, the columnar solid portion of the key as the fastener may preferably penetrate both the aligned portions of said roller body and fixture.

The fixture will reliably be protected from displacement relative to the roller body, not only in axial direction but also in circumferential direction thereof.

The anvil member also employable in the roller device of the invention may have a pointed top, an enlarged bottom, and a tapered region smoothly transferring from the top to the bottom. The top is of an outer diameter smaller than the inner diameter of the key's collapsible foot, with the bottom having an outer diameter larger than said inner diameter.

In this case, a relatively weak external force will suffice to force the anvil member to enter and smoothly expand the collapsible foot along the tapered region of such an anvil member. Consequently, deformation of the key will be rendered much smoother and surer, more firmly setting the fixture in place in the roller body.

The roller device described above may comprise a motor installed in the roller body so that a torque necessary for this body to rotate will be transmitted thereto from the motor.

Although the roller body and fixture will be subjected to vibration caused by such a motor, the fastener whose collapsible foot has been deformed will neither loosen itself nor slip off to cause any unsmooth rotation of said roller body.

From still another aspect, the present invention provides a method of making a roller device that comprises a roller body, a fixture accommodated at least in part in the roller body and secured thereto, and a fastener fixedly connecting a periphery of the fixture to a periphery of the roller body, with the fastener comprising at least one transverse key that is composed of a columnar solid portion and a cylindrical collapsible foot continuing therefrom. The key is designed such that a thrust applied axially of the key to the solid portion will expand the collapsible foot radially and outwards so as to inhibit the key from moving axially thereof, and the solid portion is retained in place to prevent the fixture from moving relative to the roller body. The method of making such a roller device may comprise the step of placing the fixture in the roller body so as to take a predetermined position therein, and the step of finally striking the fastener axially thereof so as to deform its collapsible foot radially and outwards, after inserting the fastener into transverse apertures formed in portions of the peripheries crosswise to an axis of the roller body.

When assembling this roller device by this method, the at least one key as the fastener will be placed in the apertures and then struck transversely of the roller body. As a result, the cylindrical collapsible foot of the key will collapse so as not to slip off. Thus, the fastener and the fixture will now be retained in place much more strongly as compared with the prior structures, lest they should slip off even under a vibrational condition during transportation of articles.

Preferably, the collapsible foot of the key as the fastener used in the present method to assemble the roller device may be a hollow portion of said key.

In this case, a weak force initially applied thereto from the outside suffices well to deform said foot. Such a hollow foot will make it easier to more surely fix the fixture to the roller body.

Preferably, each aperture formed in the fixture to receive the fastener used in the method may communicate with a recess that is also formed in the fixture so as to extend crosswise to a direction in which the fastener is inserted. At the step of striking the fastener in this case, the fastener's collapsible foot will be guided to deform itself along the surface of such a recess and into a close contact with this surface, when the fastener is struck axially thereof.

The recess along which the collapsible foot of the key is forced to deform itself will be effective to much surely prevent the slipping off of the fastener and fixture even under any vibrational condition.

The fastener used in the present method may comprise an anvil member in addition to the key as described above. The anvil member can be pressed partially or wholly into the collapsible foot, at the step of striking the fastener axially thereof. In this way, the collapsible foot will make its smooth dilation radially and outwards.

Reliable radial deformation of the collapsible foot is thus ensured by virtue of such an anvil member, whereby a much easier and surer consolidation of the roller body and fixture into the roller device is afforded by such a mode of the present method.

The anvil member used herein to make the roller device may have a pointed top to be disposed inside the key, an enlarged bottom to be disposed outside the key, and a tapered region smoothly transferring from the top to the bottom. The top of this anvil member is of an outer diameter smaller than the inner diameter of the key's collapsible foot, with the bottom having an outer diameter larger than said inner diameter. Therefore, such a top will lead this anvil member into the collapsible foot so as to dilate it radially and outwards, at the step of striking the fastener.

In this case, a relatively weak external force will suffice to force the anvil member to enter and smoothly and gently expand the collapsible foot along the tapered region and bottom of such an anvil member. Consequently, deformation of the key will be rendered much smoother and surer, more firmly setting the fixture in place in the roller body.

Two or more fasteners may preferably be arranged at intervals around the roller body that constitutes the roller device that will be made by the present method.

External forces such as vibration acting on the periphery of roller will be distributed throughout the fasteners. These fasteners are more surely protected from loosening themselves, with the apertures holding them becoming less likely to be deformed.

On the other hand, the columnar solid portion of t he key as the fastener used in the present method may preferably penetrate both the aligned portions of said roller body and fixture.

The fixture will reliably be protected from displacement relative to the roller body, even under any vibrational condition.

The present method of making a roller device described above may further comprise the step of installing in the roller body an electric motor serving as an actuator for driving this body to rotate.

Although the roller body and fixture constituting the roller device will be subjected to vibration causes by such a motor, the fastener whose collapsible foot will have been deformed during execution of this method will however neither loosen itself nor slip off, by virtue of the deformed collapsible portion fixing the fastener in place. Thus, notwithstanding the motor as an actuator installed in said roller body, this body will not be displaced relative to the during operation of said roller device.

BRIEF DESCRIPTION OF THE DRAWINGS

FIG. 8 is a perspective view of a hollow pin or key shown partly in cross section and employed as the fastener in the motor-installed roller which FIG. 2 illustrates;

THE PREFERRED EMBODIMENTS

Figure 1:
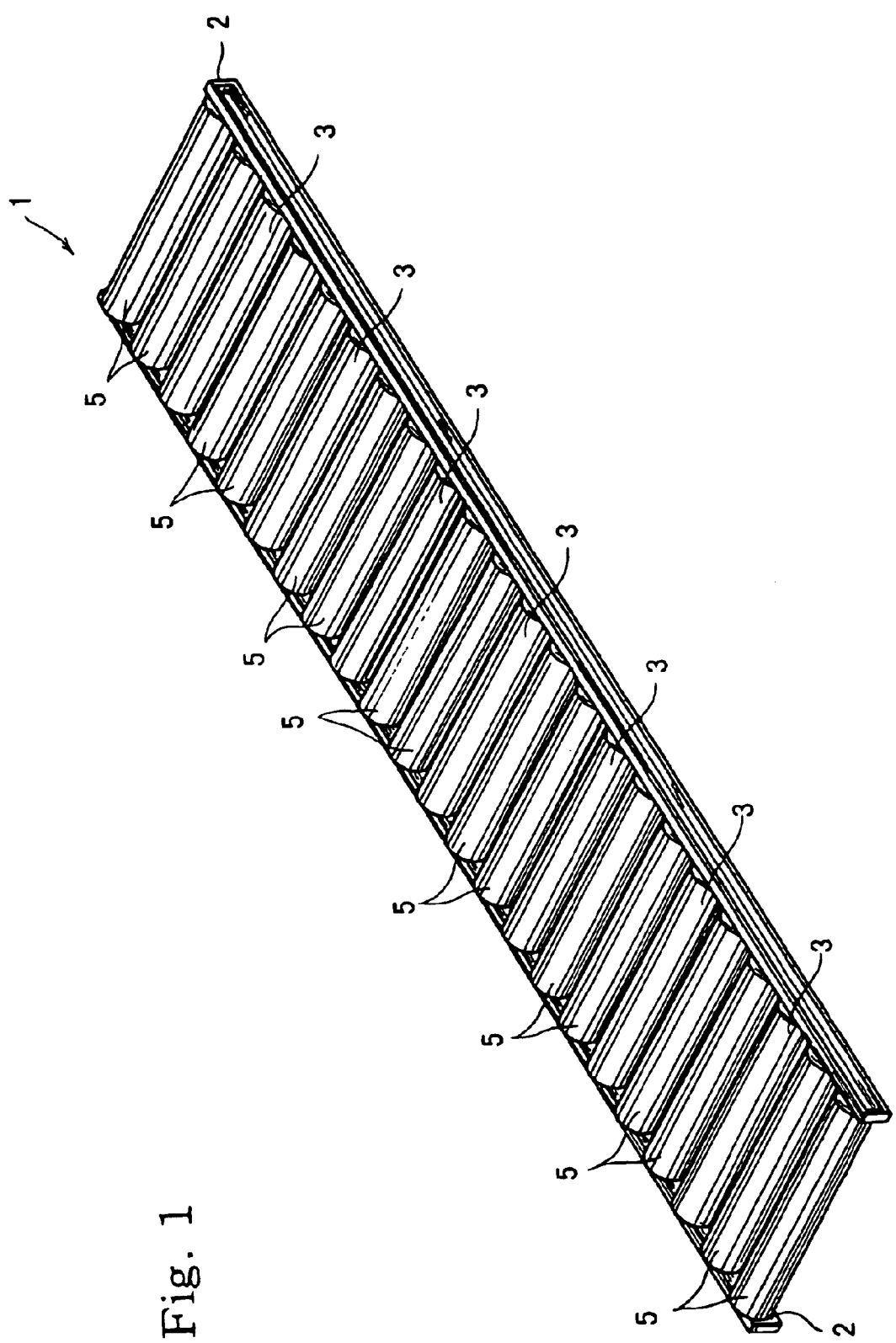
FIG. 1 is a perspective view of a transportation apparatus that is composed of motor-installed rollers in combination with free rollers, wherein each of the motor-installed and free rollers is a roller device provided in an embodiment of the invention.

Now, some embodiments of the present invention will be described in detail referring to the drawings.

The reference numeral 1 in FIG. 1 generally denotes a transportation apparatus. This apparatus 1 is a roller conveyor having parallel frames 2 and 2, between which a plurality of motor-installed rollers 3 and a plurality free rollers 5 are arranged side by side and alternating one another. Those motor-installed rollers 3 are disposed at regular intervals in a direction in which any articles are transported. Each motor-installed roller 3 intervenes between the couples of the free rollers 5.

Figure 2:
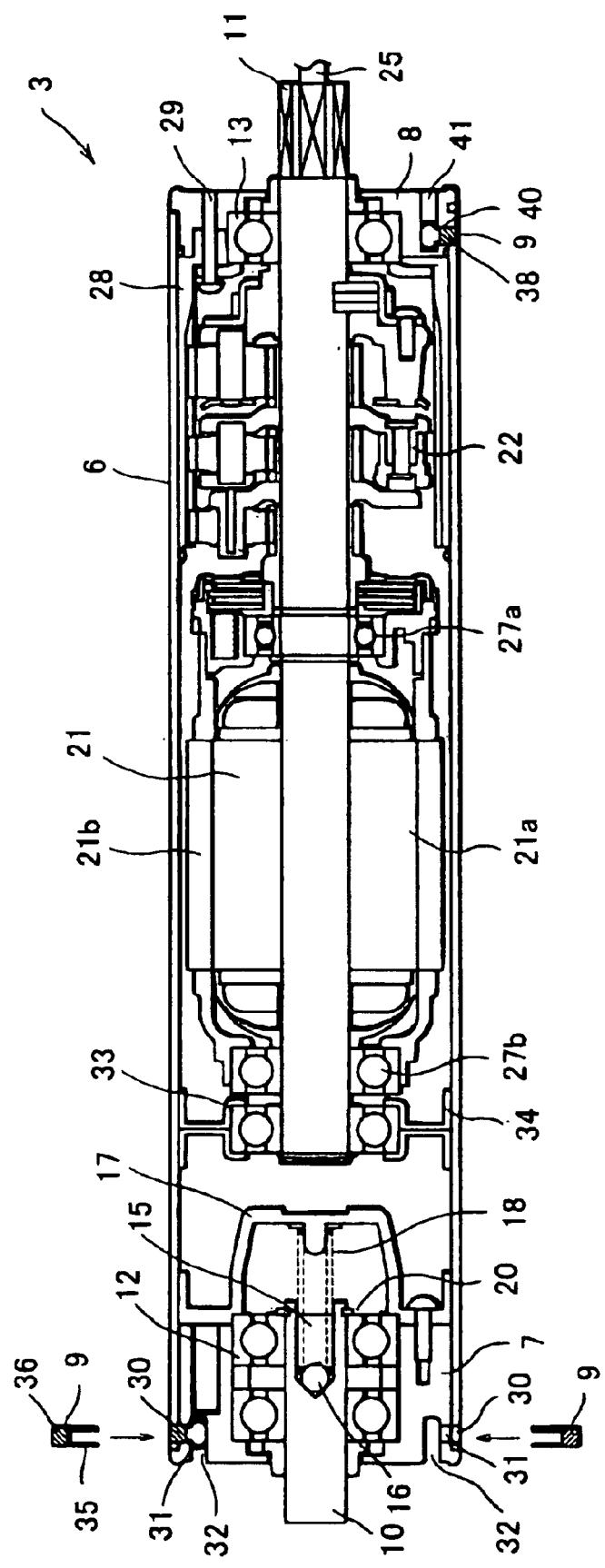
FIG. 2 is a cross section of the motor-installed roller.
Figure 3:
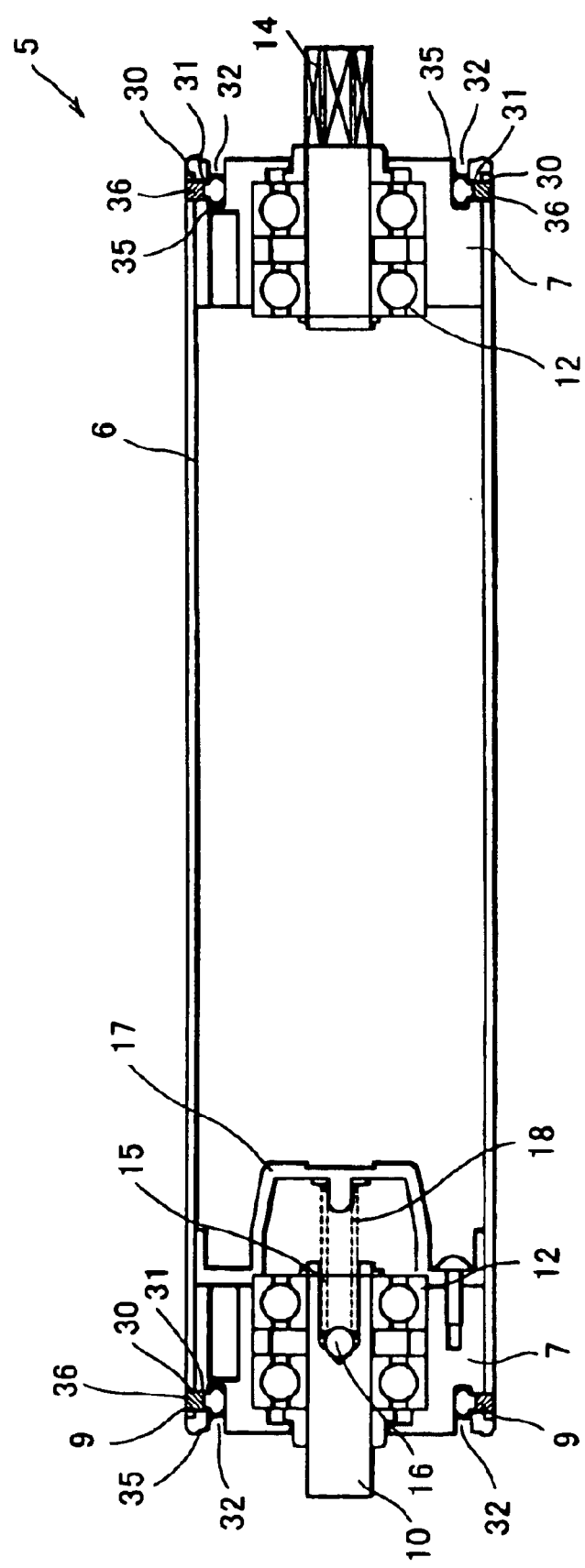
FIG. 3 is a cross section of the free roller.

As seen in FIG. 2, the motor-installed roller 3 comprises a roller body 6, closures (viz., fixtures) 7 and 8, shaft segments 10 and 11. The roller body 6 is a metal cylinder having opposite open ends closed with the closures 7 and 8, respectively. The shaft segments 10 and 11 penetrating the respective closures 7 and 8 are supported by bearings 12 and 13 so as to rotate in situ.

One of the shaft segments 10 is a rod rotating freely relative to the closure 7, that is fixed to the roller body 6 with use of hollow pins (viz., keys) 9 serving as fasteners. Fitted in an axial bore 15 of the shaft segment 10 is a ball 16 urged outwards by a coiled spring 18. A cap 17 attached to the inner face of the bearing 12 biases outwards the shaft segment 10 by the spring 18 and ball 16. Thus, the shaft segment 10 having an inner flange 20 will normally and always remain urged towards its outermost position where its flange 20 bears against the said inner face of bearing 12. However, the shaft segment 10 can be pushed a distance inwardly of the roller body 6, such that the spring 18 will permit it to spring back to its normal position when released. Owing to this structure, every motor-installed roller 3 is ready to setting in between the parallel frames 2 that have already been built up.

The other shaft segment 11 also is a rod having an outer end hexagonal in cross section and exposed to the outside of said roller body 6. A further bearing 13 is secured in the closure 8, with a still further bearing 33 being secured by a support 34 in the roller body 6. Thus, the said other segment 11 is allowed to rotate relative to both the roller body 6 and closure 8. An other pair of bearings 27*a* and 27*b* rotatably supports a rotor 21*b* of an electric motor 21. A reducer 22 for decreasing rotational speed of an out put from the motor 21 and then transmitting it to the roller body 6 is also born by the shaft segment 11. An axial bore (not shown but) extending through this segment keeps the interior of roller body 6 in communication with the exterior thereof. A power supply cable 25 for the motor 21 penetrates the axial bore has an end projecting out of the roller body 6.

As shown in FIG. 2 and noted above, the motor-installed roller 3 has the motor 21 and reducer 22 both disposed in roller body 6. This motor is an alternating-current motor of three-phase system and having stators 21*a* and the rotor 21*b*. These stators 21*a* are attached to the shaft segment 11 so as to be integral therewith, and the rotor 21*b* surrounding such stators and held by the bearings 27*a* and 27*b* spins about this segment.

The reducer 22 is a planetary gear train that operates to decrease the rotational speed of the motor's output at variable ratios. A connector 28 connecting this reducer 22 to the closure 8 is a cylindrical member which has an outer diameter substantially equal to the inner diameter of roller body 6. A set-pin 29 lying in parallel with the shaft segment 11 serves to fixedly secure the connector 28 to closure 8. This fixture 8 in turn is made integral with roller body 6 by means of the at least one hollow pins (viz., keys) 9 serving as the fasteners. In this way, the roller body 6 receiving the torque from the closure 8 through connector 28 will be driven to rotate.

On the other hand, each of the free rollers 5 resembles such a motor installed roller 3 in its appearance, and has its roller body 6 having opposite ends similarly closed with fixtures 7 and 7. Shaft segments 10 and 14 each projecting out of the opposite ends of this free roller 5 are rotatingly supported in place by bearings 12 and 12, respectively. One of the shaft segments 14 is, similarly to that 11 described above, a rod having an outer hexagonal portion. Thus, the roller body 6 of this free roller 5 also supported by those segments 10 and 14 is likewise rotatable freely relative thereto.

Both the motor-installed and free rollers 3 and 5 are characterized by the structure for fixing their roller bodies 6 either to closures 7 and 8 or to the connector 28. Therefore, exemplified hereinafter is the structure for fixedly connecting the roller body 6 to the closure 7.

Figure 5:
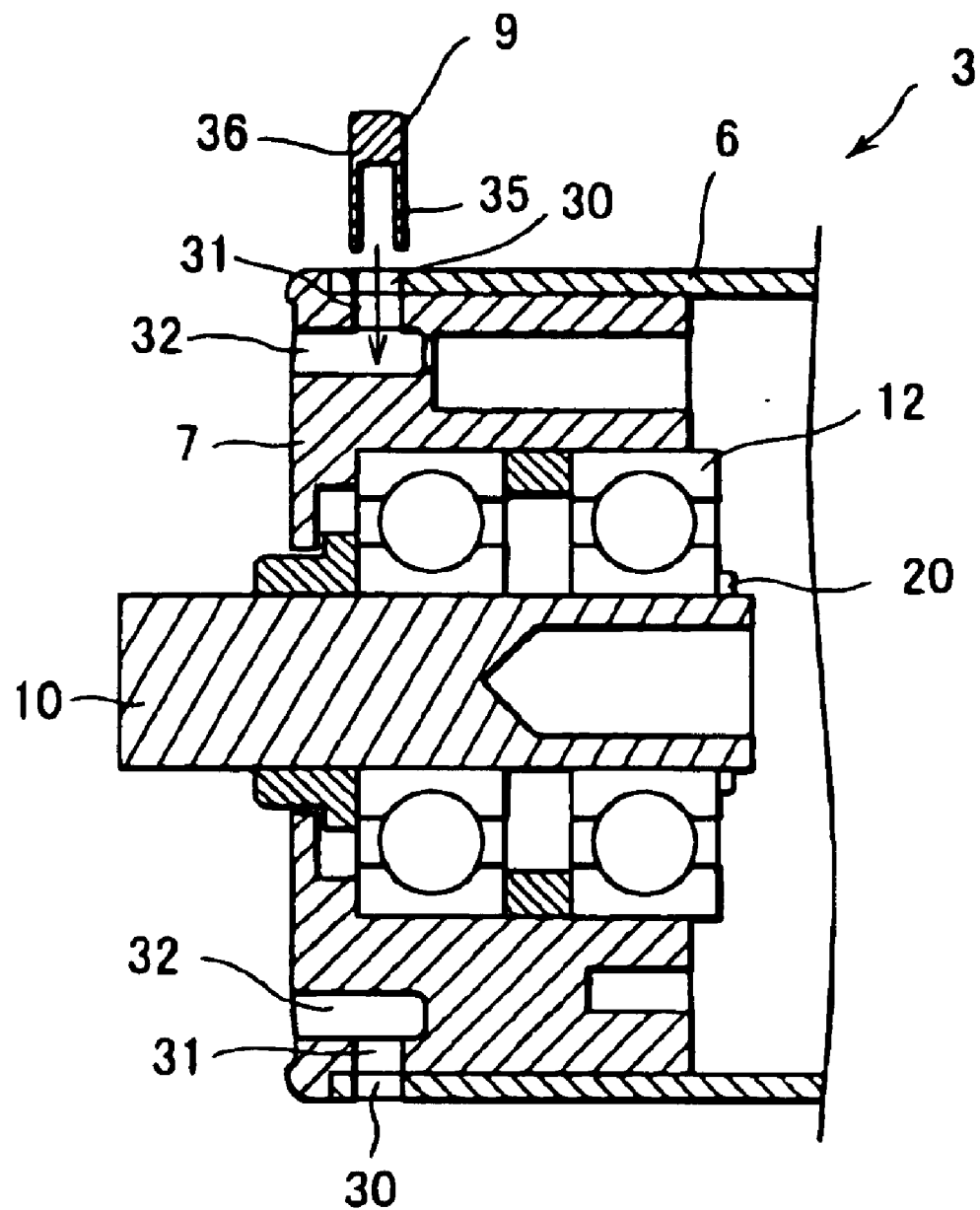
FIG. 5 is a cross section of a fixture shown in FIG. 2 and being secured to the roller body, at a first stage in assembling the roller device.

FIG. 5 illustrates on an enlarged scale relevant part and portions including or adjacent to the closure 7 in the motor-installed roller 3 in this embodiment. Transverse apertures 30 are formed at regular angular intervals around the roller body 6 to penetrate its peripheral portions. Correspondingly, mating apertures 31 are formed in the closure 7 so as to be aligned with the former aperture 30, respectively. This closure 7 in the motor-installed roller 3 has recesses 32 also formed therein but transversely so as to extend crosswise to both the former and latter apertures 30 and 31 and to directly communicate with the latter 31.

Figure 4:
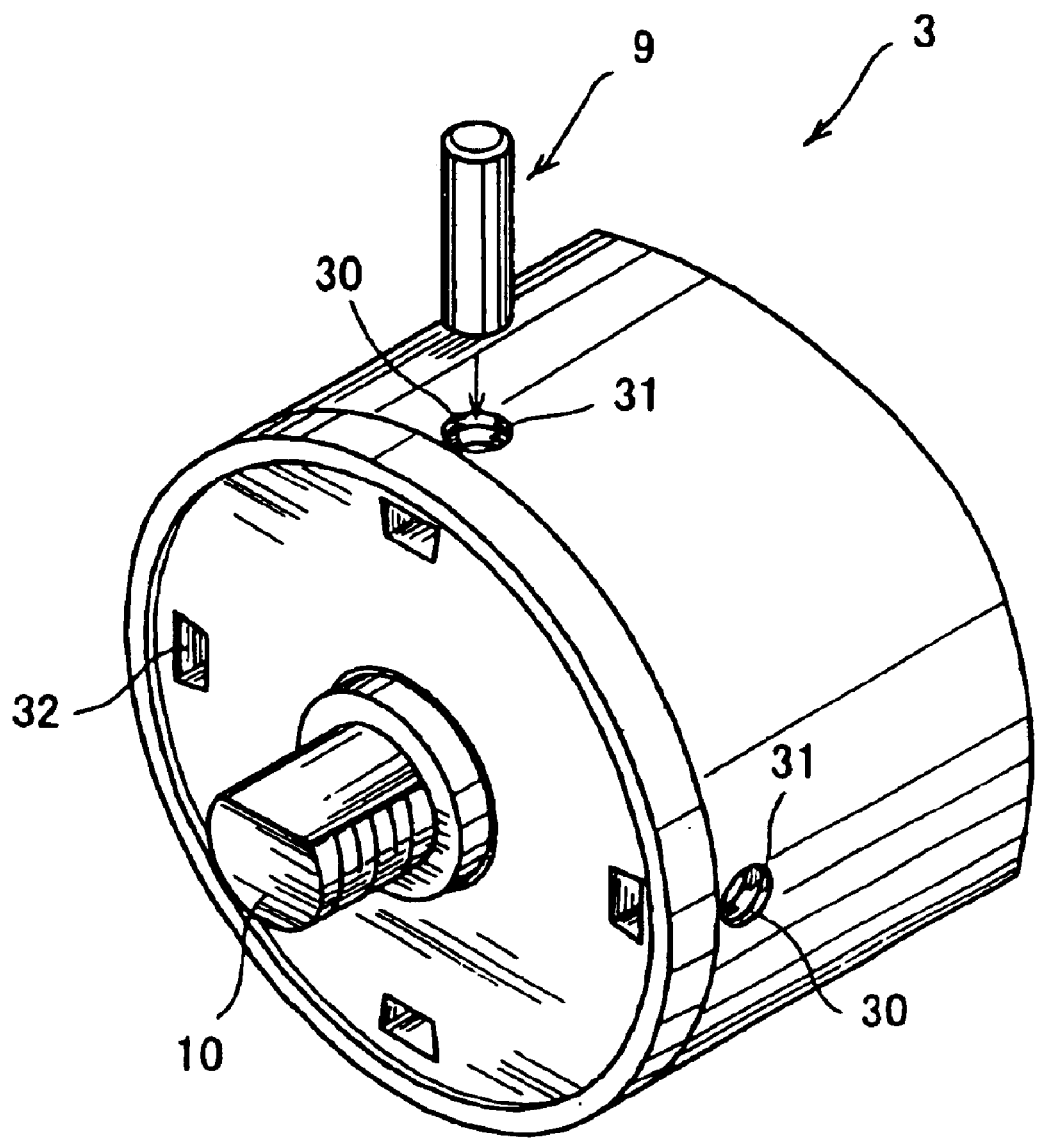
FIG. 4 is a fragmentary perspective view of principal parts constituting a roller body in the roller shown in FIG. 2.
Figure 8:
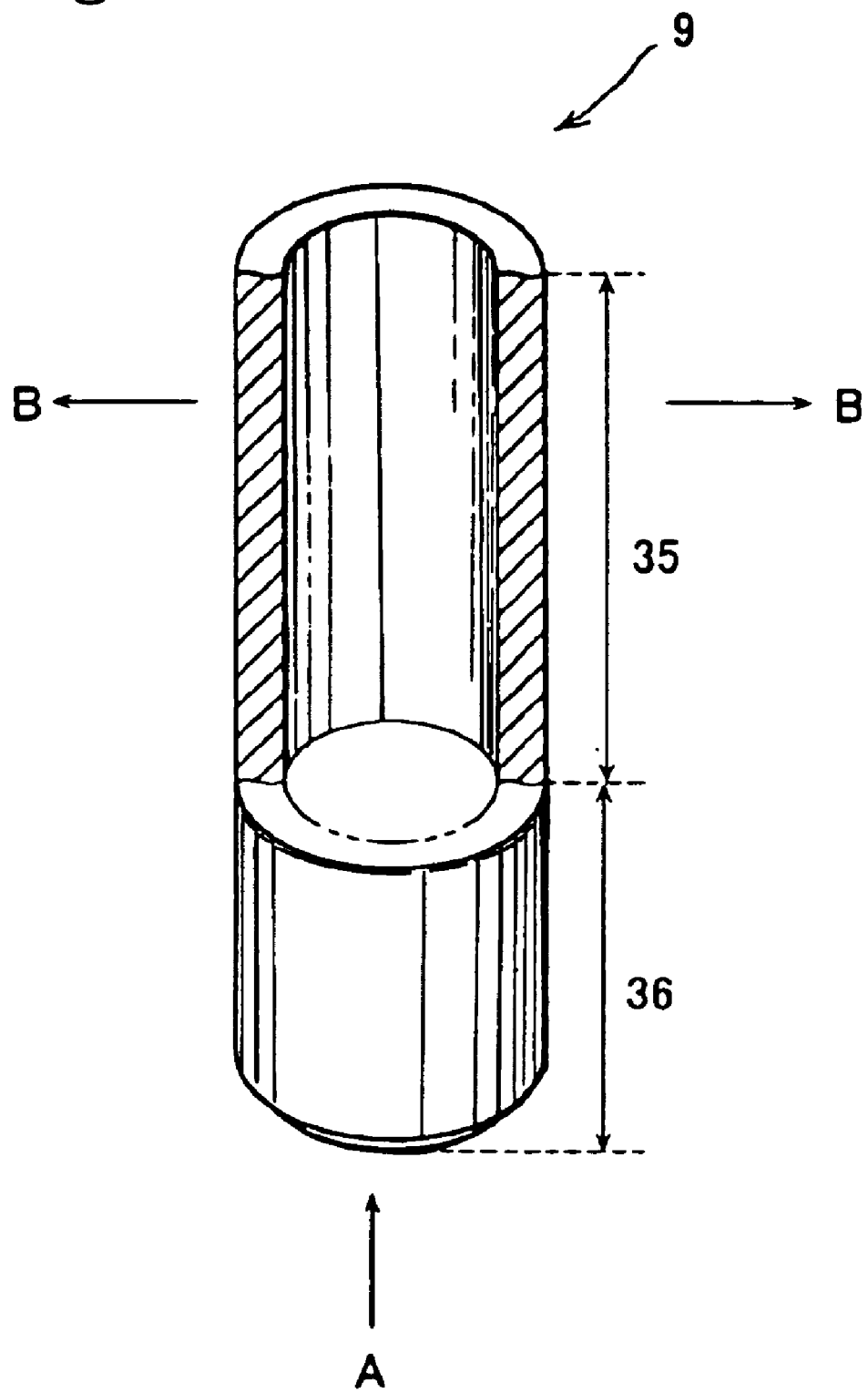

The hollow pins 9 each for insertion into the two apertures 30 and 31 aligned with each other as shown in FIG. 4 are cylindrical pieces made of a mild steel as seen in FIG. 8. Each pin 9 of substantially the same diameter as these apertures 30 and 31 is composed of a columnar solid head or portion 36 and a hollow collapsible foot 35 integrally continuing therefrom. If an axial thrust is applied to the solid head 36 (in a direction of the arrow 'A' in FIG. 8), then the hollow foot 35 will be depressed outwards radially of this pin 9 (in another direction of the arrows 'B' in FIG. 8).

Figure 6:
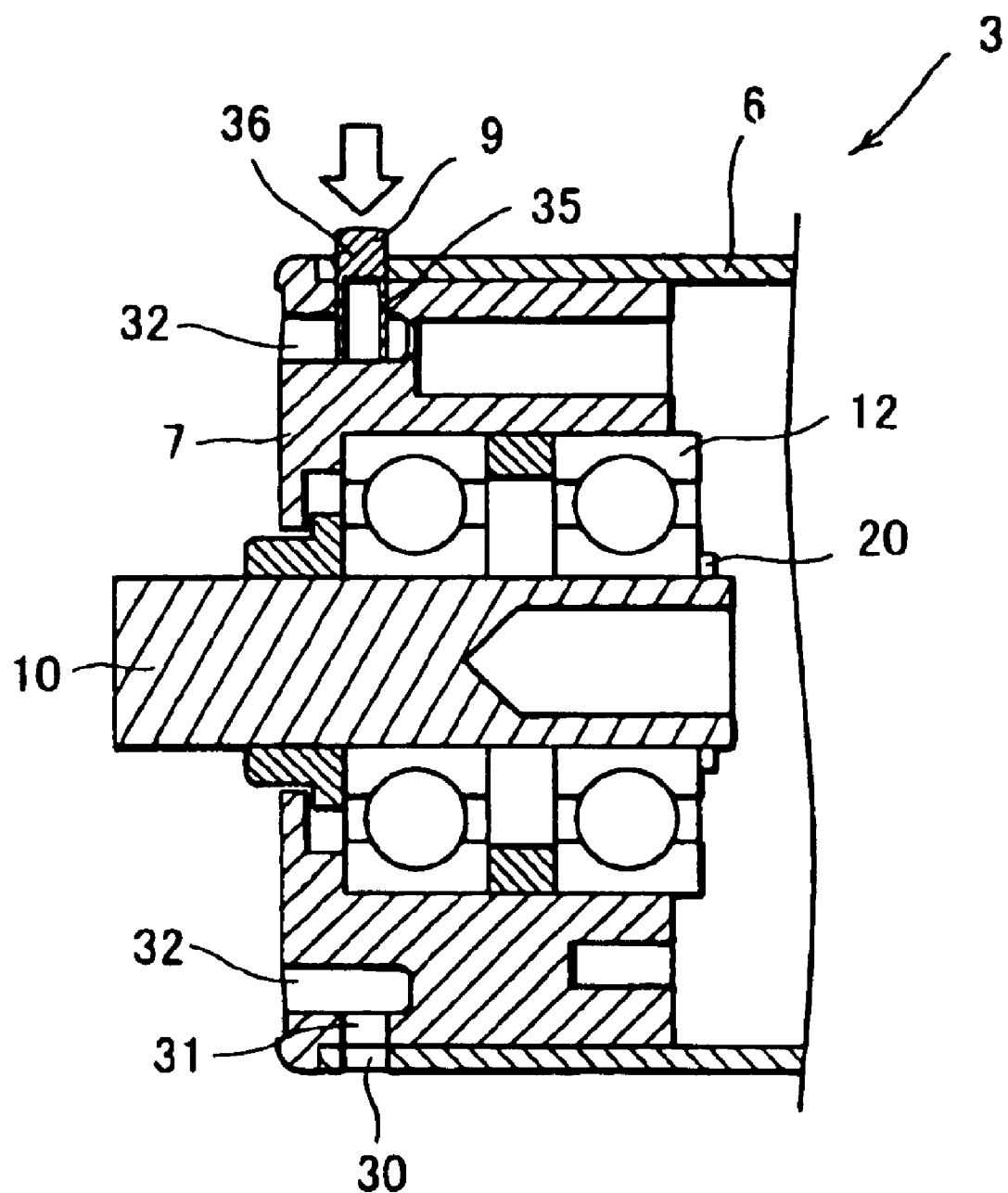
FIG. 6 is a cross section of the fixture shown in FIG. 2 and being secured to the roller body, at a second stage in assembling the roller device.

Every hollow pin 9 will be inserted into the aligned apertures 30 and 31, from the outside of roller body 6, with its foot 35 leading the head 36 in a manner shown in FIGS. 4 and 5. The arrow in FIG. 6 indicates a direction in which the exposed head 36 will be struck, once the inner end of foot 35 has come into contact with the inner wall of recess 32. An axial thrust applied to the head 36 of pin 9 in this state will cause deformation of its foot 35 to be collapsed along the said inner wall of recess 32. This is because the pin 9 shown in FIG. 6 is in a state that it can no longer be pushed in transversely of roller body 6, but now deflecting the thrust into outward radial portions and consequently depressing its foot 35 within the recess 32.

Figure 7:
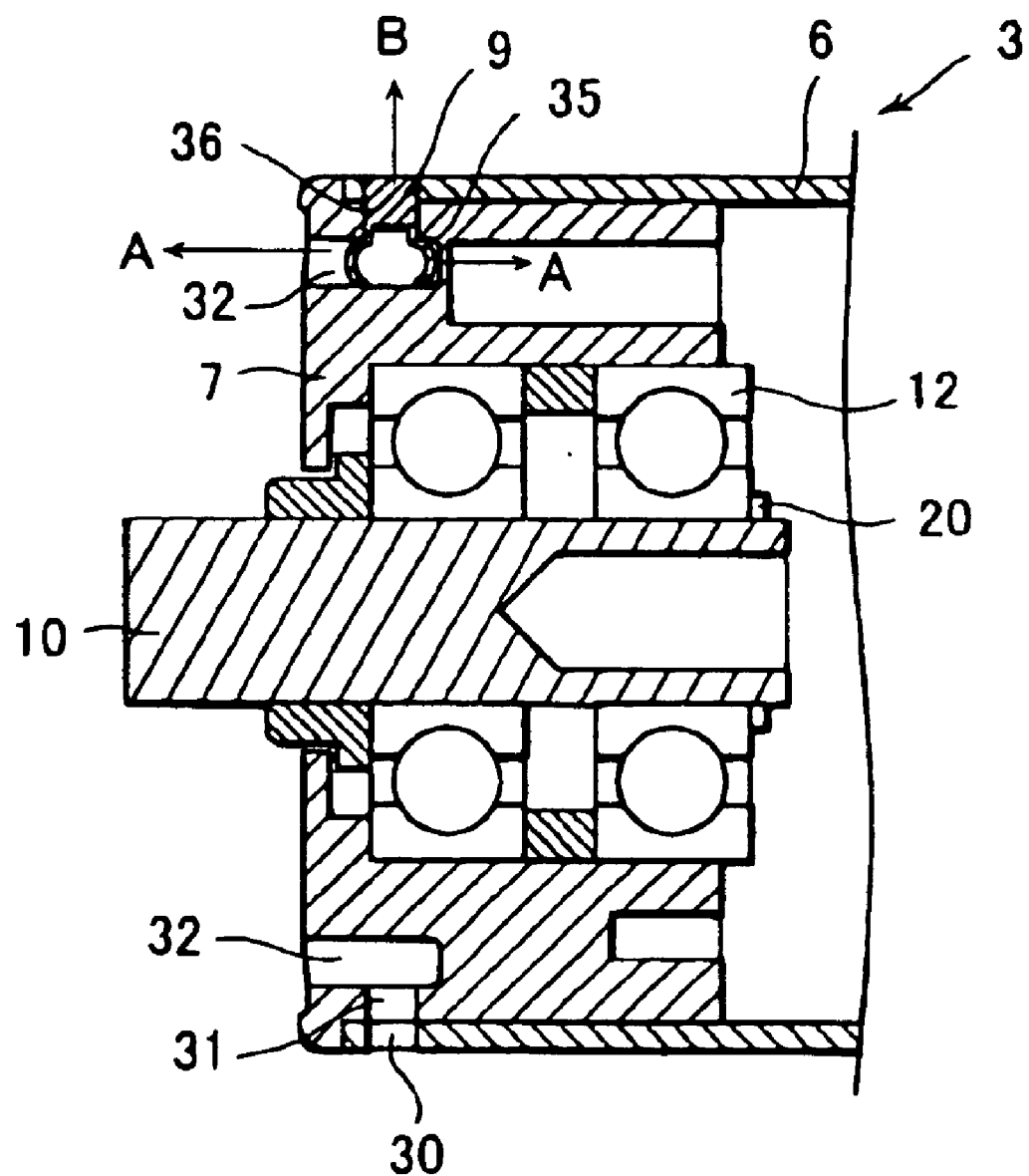
FIG. 7 is a cross section of the fixture shown in FIG. 2 and being secured to the roller body, at a third stage in assembling the roller device.

The hollow pin 9 will be struck at its head 36 until its top come into flush with the outer peripheral surface of roller body 6. As a result, its foot 35 permanently increases its diameter to occupy the inner region of recess 32 as shown in FIG. 7 (in a fashion indicated therein by the arrows 'A'), almost entirely filling said inner region, without leaving any noticeable vacant space therein. Even if any external force 'B' acts on the pin 9 in an axial direction thereof as shown in FIG. 7, it will never move in this direction to fall off the apertures 30 and 31.

The solid portion 36 of hollow pin 9 having been struck in the described manner is retained through both the apertures that are formed respectively in the roller body 6 and closure 7. Due to the pin 9 brought into this state, this body can neither move axially nor tangentially relative to this fixture, thus protecting the closure 7 from slipping off said body of the motor-installed roller 3.

Similarly to the closure 7 discussed above, the other closure 8 is firmly secured to the roller body 6 of this motor-installed roller 3. As seen in FIG. 2, an outer aperture 38 formed in roller body 6 is aligned with an inner aperture 40 that is formed radially in the closure 8, with the latter aperture 40 continuing to a space 41 formed in and axially of this fixture 8. The collapsible foot 35 of hollow pin 9 will lead it when it is inserted into the outer aperture 38 and struck inwardly of roller body 6. Thus, this foot 35 will also deform itself along the inner surface of recess 41, so as to expand therein to prevent any subsequent displacement or incidental removal of said pin 9 in axial direction thereof.

The solid portion 36 of hollow pin 9 having been struck to have its top in flush with the roller body surface will be retained through both the apertures that are formed respectively in the roller body 6 and closure 8. Due to the pin 9 kept in this state, this body can neither move axially nor tangentially relative to this fixture, thus protecting closure 8 from slipping off said body 6.

Also in each free roller 5, its roller body 6 is secured to its closure 7 quite in the same manner as in each motor-installed roller 3. The hollow pin 9 not slipping off is thus effective to firmly consolidate the body and fixture into the free roller.

The scope of the present invention is not delimited to such a structure using the hollow pin 9 as detailed above. Instead, the invention may cover a case wherein a combination 50 of a hollow pin with an anvil member is employed to fasten each fixture 7 or 8 to the roller body 6, as in an example given below with respect to one of the fixtures 7.

Figure 9:
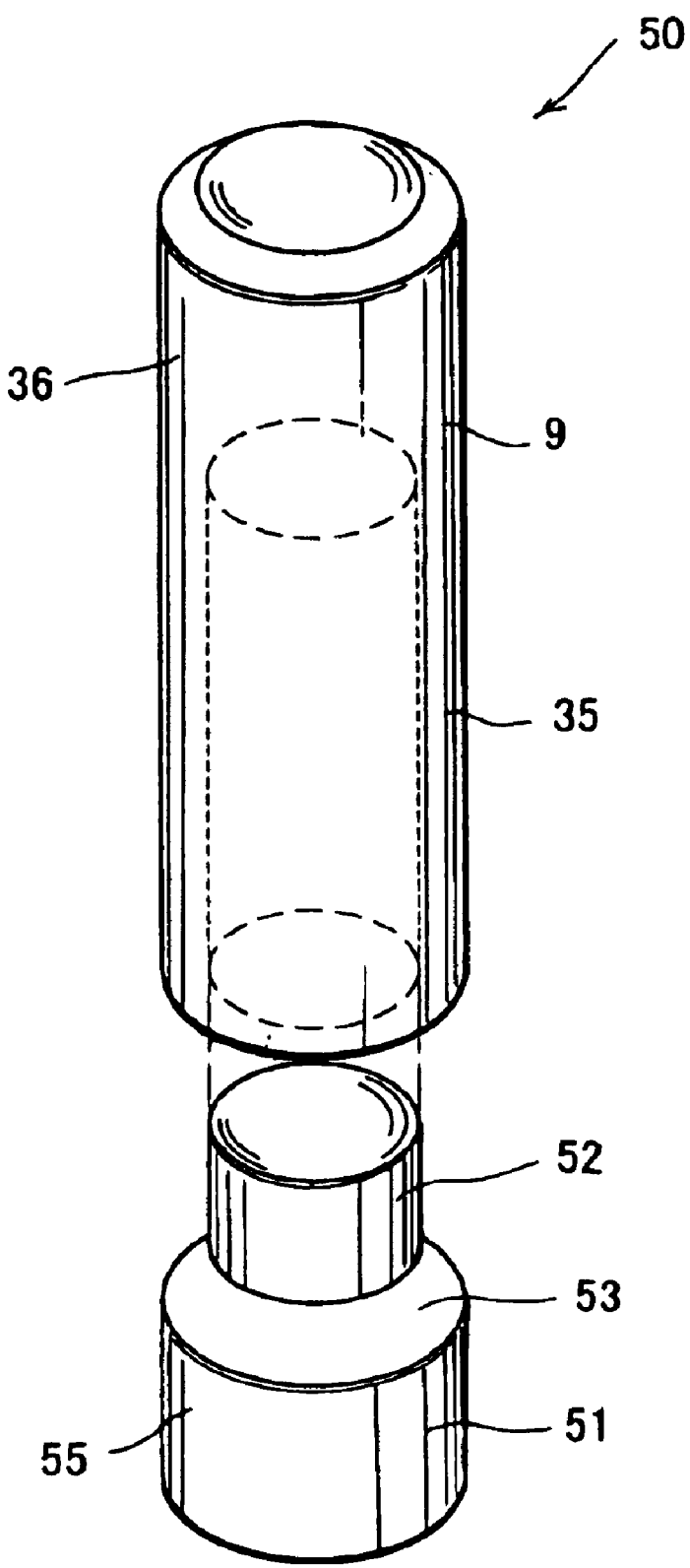
FIG. 9 is an exploded perspective view of a combination of the pin with an anvil member used to secure the fixture in the roller body.

FIG. 9 illustrates the combination 50 of a hollow pin 9 and an anvil 51, that is a generally columnar piece consisting of three portions of different diameters. A pointed top 52 of this anvil 51 continues to a tapered portion 53, which in turn continues to a base 55. Outer diameter of the pointed top 52 is substantially equal to the inner diameter of collapsible foot 35 of hollow pin 9. Outer diameter of the base 55 thicker than the pointed top 52 is not smaller than the outer diameter of the solid basal portion 36 of hollow pin 9, and the tapered portion 53 intervening between the top 52 and base 55 gradually increase its diameter towards the base 55.

Figure 10:
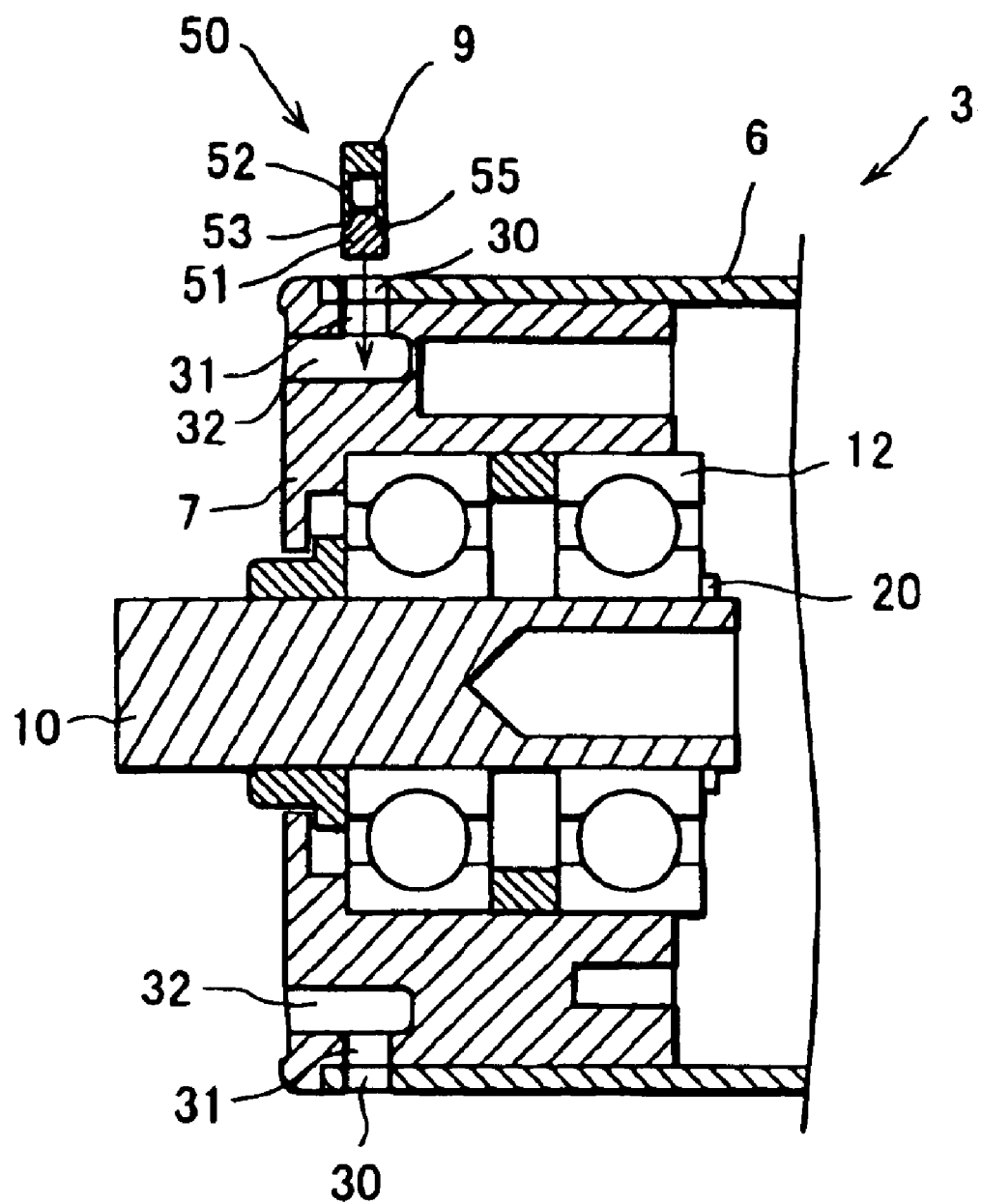
FIG. 10 is a cross section of the fixture being secured to the roller body, at a first stage and using the combination of pin and anvil.
Figure 11:
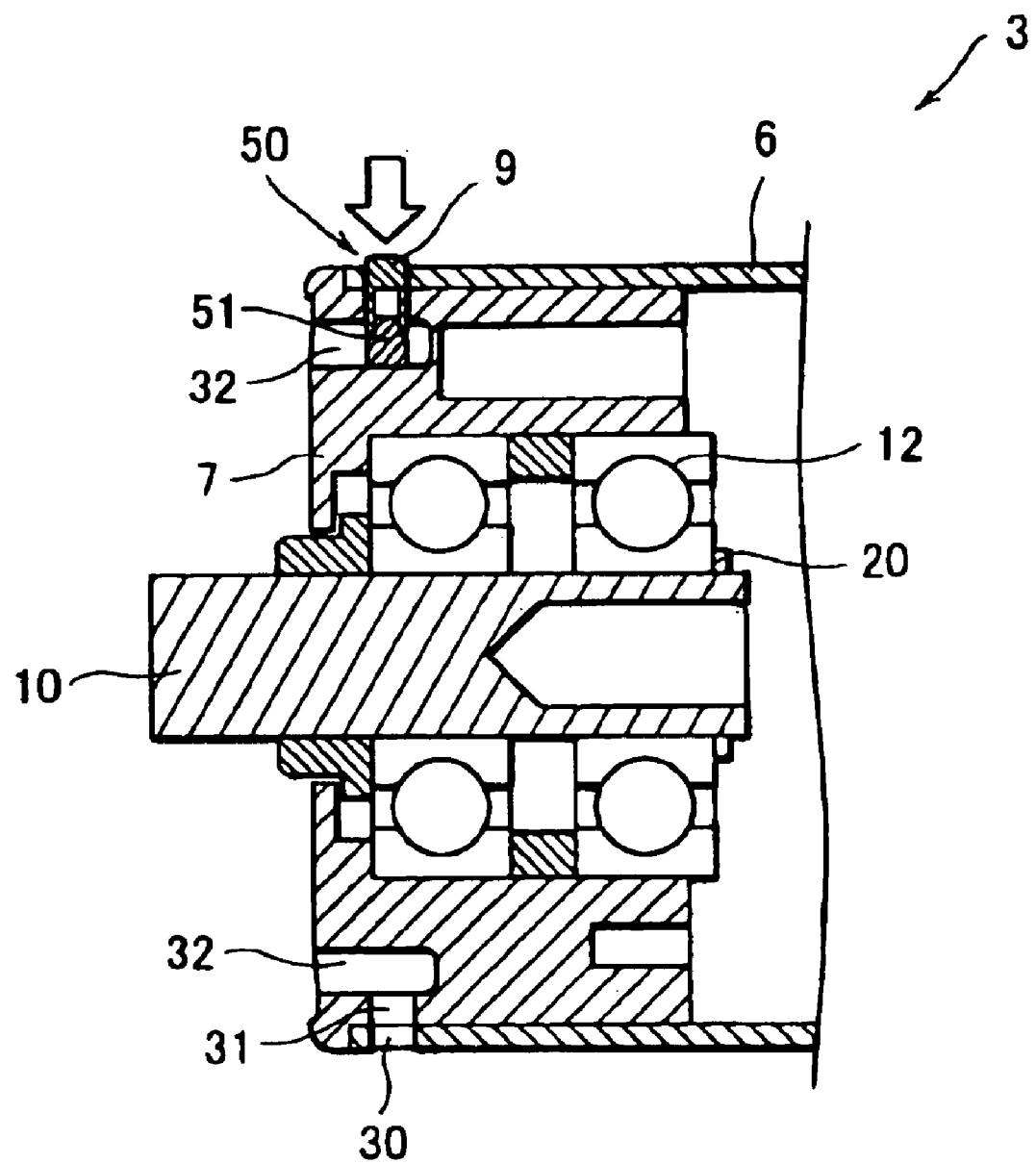
FIG. 11 is a cross section of the fixture being secured to the roller body, at a second stage and using the combination of pin and anvil.
Figure 12:
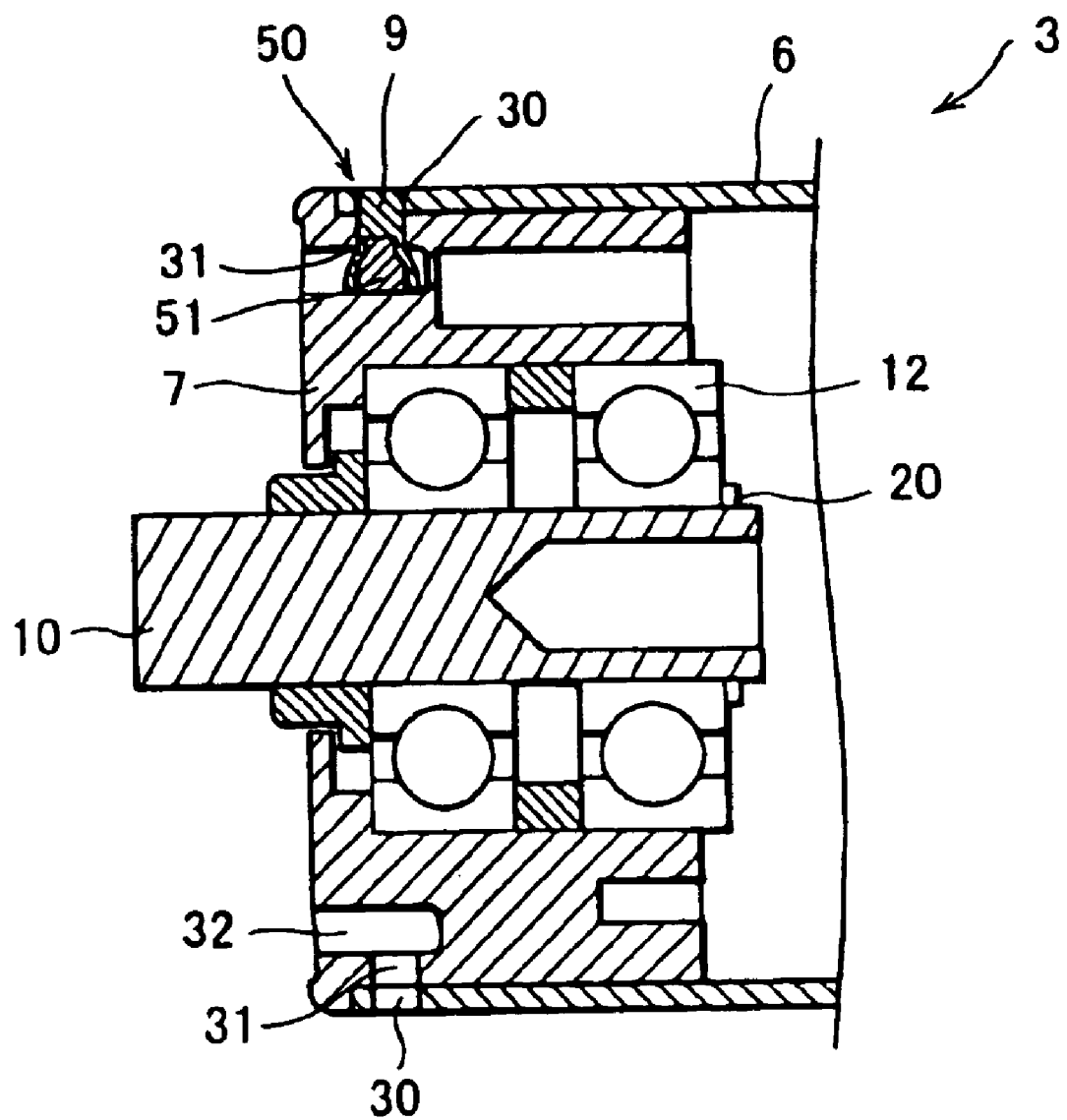
FIG. 12 is a cross section of the fixture being secured to the roller body, at a third stage using the combination of pin and anvil.

As will be seen best in FIG. 10, the pointed top 52 of anvil 51 is inserted in the collapsible foot 35 of pin 9 so as to be adjoined thereto to form the combination 50. The anvil 51 in such an integral combination will lead same into the aperture 30 formed in the roller body 6. Once the bottom of anvil 51 has reached the inner peripheral wall of recess 32, the solid basal portion 36 projecting from the outer surface of said body 6 will be struck as seen in FIG. 11. Consequently, the pointed top 52 of anvil 51 is forced deeper and deeper into the hollow foot 35 so that the latter will be expanded to gradually change its shape in conformity with the tapered portion 53 and base 55 of the anvil member 51 in a fashion as shown in FIG. 12. By virtue of the collapsible foot 35 thus made larger in diameter than the apertures 30 and 31, the hollow pin 9 will never slop off the roller body, out of these apertures.

Also in case of such a combination 50 as shown in FIG. 12, the solid portion 36 of pin 9 extends through both the mating portions of roller body 6 and closure 7. Thus, this closure 7 is protected from making any tangential or axial displacement and also from slipping off.

The combination 50 of such an anvil 51 with the hollow pin 9 may also used to fasten the connector 28 to roller body 6.

Although the hollow pin 9 in the described embodiments is a smooth cylindrical piece, its collapsible foot 35 may be modified to have slits or grooves not shown. The thrust applied to this pin will render it easier and surer to deform the foot into any desired and predetermined shape, thereby more reliably fixing the pin 9 in place and firmly fastening the roller body 6 to closure 7 as the fixture.

Usage of the hollow pin 9 or the combination 50 thereof with an anvil 51 is exemplified above for the described purposes. However, the fixture may alternatively be fastened to the roller body 6 in any proper manner not shown but using the bearings, connector 28, motor 21 or the like installed in said body 6.

The motor-installed rollers 3 and free rollers 5 are incorporated in the roller conveyor as a transportation apparatus 1 in the described embodiments, though they may be used in any other apparatus such as a belt conveyor, a winding machine or the like.

Although the hollow pin 9 and anvil 51 are made of a mild steel in the embodiments, they may alternatively be formed of any other metal such as an aluminum alloy, zinc alloy, and they may be made of different materials.

The alternating-current three-phase motor 21 may be replace with any other motor such as a direct-current motor.

In the roller device provided herein, the fastener is fixed in place by deforming its collapsible portion, with its solid portion functioning to prevent the roller body from moving relative to the fixture, whereby any vibration imparted to the device during its operation will never cause the slipping off of the fasteners.

What is claimed is:

1. A roller device comprising:

a roller body, a fixture accommodated at least in part in the roller body and secured thereto, a fastener fixedly connecting a periphery of the fixture to a periphery of the roller body, the fastener comprising at least one transverse key driven in transverse apertures that are formed in the portions of the peripheries crosswise to an axis of the roller body, and the transverse key being composed of a columnar solid portion and a cylindrical collapsible foot continuing therefrom, such that a thrust applied axially of the key to the solid portion bears the fastener against the fixture so as to axially compress the collapsible foot and thereby cause the collapsible foot to expand radially and outwards so as to inhibit the key from moving axially thereof, whereby the solid portion is retained in place to prevent the fixture from moving relative to the roller body, wherein the collapsible foot of the key incorporated in the roller device is a hollow portion of said key.

2. A roller device as defined in claim 1, wherein the roller device comprises at least a second fastener fixedly connecting a periphery of the fixture to a periphery of the roller body.

3. A roller device as defined in claim 1, wherein each aperture formed in the fixture to receive the fastener communicates with a recess that also is formed in the fixture so as to extend crosswise to a direction in which the fastener is inserted.

4. A roller device as defined in claim 1, wherein each aperture formed in the fixture to receive the fastener communicates with a recess that also is formed in the fixture so as to extend crosswise to a direction in which the fastener is inserted, whereby the fastener's collapsible foot is guided to deform itself along a surface of the recess in the direction so as to become in contact with the surface.

5. A roller device as defined in claim 1, wherein the columnar solid portion penetrates both the roller body and the fixture.

6. A roller device as defined in claim 1, further comprising a motor installed in the roller body so that a torque necessary for the roller body to rotate is transmitted thereto from the motor.

7. A roller device comprising:

a roller body, a fixture accommodated at least in part in the roller body and secured thereto, a fastener fixedly connecting a periphery of the fixture to a periphery of the roller body, the fastener comprising at least one transverse key and at least one anvil member cooperating therewith, the transverse key being composed of a columnar solid portion and a cylindrical collapsible foot continuing therefrom, such that a thrust applied axially of the key to the solid portion expands the collapsible foot, and the solid portion is retained in place to prevent the fixture from moving relative to the roller body, and the anvil member being shaped such that the thrust applied to the solid portion forces this member into the collapsible foot so that this foot is expanded radially and outwards.

8. A roller device as defined in claim 7, wherein the collapsible foot of the key incorporated in the roller device is a hollow portion of said key.

9. A roller device as defined in claim 7, wherein the roller device comprises at least a second fastener fixedly connecting a periphery of a fixture to a periphery of the roller body.

10. A roller device as defined in claim 7, wherein each aperture formed in the fixture to receive the fastener communicates with a recess that also is formed in the fixture so as to extend crosswise to a direction in which the fastener is inserted.

11. A roller device as defined in claim 7, wherein each aperture formed in the fixture to receive the fastener communicates with a recess that also is formed in the fixture so as to extend crosswise to a direction in which the fastener is inserted, whereby the fastener's collapsible foot is guided to deform itself along a surface of the recess in the direction so as to become in contact with the surface.

12. A roller device as defined in claim 7, wherein the columnar solid portion penetrates both the roller body and the fixture.

13. A roller device as defined in claim 7, wherein the anvil member has a pointed top, an enlarged bottom, and a tapered region smoothly transferring from the top to the bottom, such that the top is of an outer diameter smaller than the inner diameter of the key's collapsible foot, with the bottom having an outer diameter larger than said inner diameter.

14. A roller device as defined in claim 7, further comprising a motor installed in the roller body so that a torque necessary for this body to rotate is transmitted thereto from the motor.

15. A method of making a roller device that comprises a roller body, a fixture accommodated at least in part in the roller body and secured thereto, and a fastener fixedly connecting a periphery of the fixture to a periphery of the roller body, with the fastener comprising at least one transverse key that is composed of a columnar solid portion and a cylindrical collapsible foot continuing therefrom, and the key is designed such that a thrust applied axially of the key to the solid portion expands the collapsible foot radially and outwards so as to inhibit the key from moving axially thereof, and the solid portion is retained in place to prevent the fixture from moving relative to the roller body, the method comprising the steps of:

placing the fixture in the roller body so as to take a predetermined position therein, and striking the fastener axially thereof to bear the fastener against the fixture so as to axially compress the collapsible foot and thereby deform the collapsible foot radially and outwards, after previously inserting the fastener into transverse apertures formed in portions of the peripheries crosswise to an axis of the roller body, wherein the collapsible foot of the key incorporated in the roller device is a hollow portion of said key.

16. The method as defined in claim 15, wherein each aperture formed in the fixture to receive the fastener communicates with a recess that also is formed in the fixture so as to extend crosswise to a direction in which the fastener is inserted, whereby at the step of striking the fastener its collapsible foot is guided to deform itself along a surface of the recess in the direction so as to become in contact with the surface.

17. The method as defined in claim 15, wherein the fastener further comprises at least one anvil member cooperating with the transverse key and shaped such that at the step of striking the fastener the thrust applied to the solid portion forces this member into the collapsible foot so that this foot is expanded radially and outwards.

18. The method as defined in claim 15, wherein the fastener further comprises at least one anvil member cooperating with the transverse key, and the anvil member has a pointed top, an enlarged bottom, and a tapered region smoothly transferring from the top to the bottom, such that the top is of an outer diameter smaller than the inner diameter of the key's collapsible foot, with the bottom having an outer diameter larger than said inner diameter, so that at the step of striking the fastener the thrust applied to the solid portion causes the pointed top to lead the anvil member into the collapsible foot so as to expand it radially and outwards.

19. The method as defined in claim 15, wherein at the step of striking the fastener the columnar solid portion penetrates both the roller body and the fixture.

20. A roller device comprising:
a roller body,
a fixture accommodated at least in part in the roller body and secured thereto,
a fastener fixedly connecting a periphery of the fixture to a periphery of the roller body,
the fastener comprising at least one transverse key driven in transverse apertures that are formed in the portions of the peripheries crosswise to an axis of the roller body, and
the transverse key being composed of a columnar solid portion and a cylindrical collapsible foot continuing therefrom, such that a thrust applied axially of the key to the solid portion expands the collapsible foot radially and outwards so as to inhibit the key from moving axially thereof,
whereby the solid portion is retained in place to prevent the fixture from moving relative to the roller body,
wherein each aperture formed in the fixture to receive the fastener communicates with a recess that also is formed in the fixture so as to extend crosswise to a direction in which the fastener is inserted, the fastener's collapsible foot is guided as the fastener is inserted to deform itself against a surface defined by a part of the roller device so as to become in contact with the surface.

21. The roller device as defined in claim 20 wherein the surface faces axially relative to the fastener.

22. A method of making a roller device that comprises a roller body, a fixture accommodated at least in part in the roller body and secured thereto, and a fastener fixedly connecting a periphery of the fixture of a periphery of the roller body, with the fastener comprising at least one transverse key that is composed of a columnar solid portion and a cylindrical collapsible foot continuing therefrom, and the key is designed such that a thrust applied axially of the key to the solid portion expands the collapsible foot radially and outwards so as to inhibit the key from moving axially thereof, and the solid portion is retained in place to prevent the fixture from moving relative to the roller body, the method comprising the steps of:

placing the fixture in the roller body so as to take a predetermined position therein, and
striking the fastener axially thereof to deform the collapsible foot radially and outwards, after previously inserting the fastener into transverse apertures formed in portions of the peripheries crosswise to an axis of the roller body,
wherein each aperture formed in the fixture to receive the fastener communicates with a recess that also is formed in the fixture so as to extend crosswise to a direction in which the fastener is inserted,
the step of striking the fastener comprising the step of causing the collapsible foot to contact a surface defined by a part of the roller device and thereby deform itself along the surface in the direction so as to become in contact with the surface.

23. A method of making a roller device that comprises a roller body, a fixture accommodated at least in part in the roller body and secured thereto, and a fastener fixedly connecting a periphery of the fixture to a periphery of the roller body, with the fastener comprising at least one transverse key that is composed of a columnar solid portion and a cylindrical collapsible foot continuing therefrom, and the key is designed such that a thrust applied axially of the key to the solid portion expands the collapsible foot radially and outwards so as to inhibit the key from moving axially thereof, and the solid portion is retained in place to prevent the fixture from moving relative to the roller body, the method comprising the steps of:

placing the fixture in the roller body so as to take a predetermined position therein, and
striking the fastener axially thereof to deform its collapsible foot radially and outwards, after previously inserting the fastener into transverse apertures formed in portions of the peripheries crosswise to an axis of the roller body,
wherein the fastener further comprises at least one anvil member cooperating with the transverse key and shaped such that at the step of striking the fastener the thrust applied to the solid portion forces this member into the collapsible foot so that this foot is expanded radially and outwards.

24. A method of making a roller device that comprises a roller body, a fixture accommodated at least in part in the roller body and secured thereto, and a fastener fixedly connecting a periphery of the fixture to a periphery of the roller body, with the fastener comprising at least one transverse key that is composed of a columnar solid portion and a cylindrical collapsible foot continuing therefrom, and the key is designed such that a thrust applied axially of the key to the solid portion expands the collapsible foot radially and outwards so as to inhibit the key from moving axially thereof, and the solid portion is retained in place to prevent the fixture from moving relative to the roller body, the method comprising the steps of:

placing the fixture in the roller body so as to take a predetermined position therein, and
striking the fastener axially thereof to deform its collapsible foot radially and outwards, after previously inserting the fastener into transverse apertures formed in portions of the peripheries crosswise to an axis of the roller body,
wherein at the step of striking the fastener, the columnar solid portion penetrates both the roller body and the fixture.

* * * * *

UNITED STATES PATENT AND TRADEMARK OFFICE
CERTIFICATE OF CORRECTION

PATENT NO.         : 6,755,299 B2                                                  Page 1 of 1
APPLICATION NO. : 10/348374
DATED              : June 29, 2004
INVENTOR(S)        : Kazuo Itoh et al.

It is certified that error appears in the above-identified patent and that said Letters Patent is hereby corrected as shown below:

On the title page item (73), The spelling of the Assignee's name is incorrect. The correct spelling should be "Itoh Electric Company Limited".

Signed and Sealed this

Twenty-eighth Day of November, 2006

JON W. DUDAS
*Director of the United States Patent and Trademark Office*